United States Patent
Crane et al.

(10) Patent No.: US 11,919,626 B2
(45) Date of Patent: *Mar. 5, 2024

(54) CONTROLLER FOR AN AIRCRAFT BRAKING SYSTEM

(71) Applicant: AIRBUS OPERATIONS LIMITED, Bristol (GB)

(72) Inventors: Nicholas Crane, Bristol (GB); Adrian Harrison, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,401

(22) Filed: May 6, 2022

(65) Prior Publication Data

US 2022/0266991 A1    Aug. 25, 2022

Related U.S. Application Data

(63) Continuation of application No. 16/275,682, filed on Feb. 14, 2019, now Pat. No. 11,345,466.

(30) Foreign Application Priority Data

Feb. 15, 2018  (GB) ..................... 1802485

(51) Int. Cl.
*B64C 25/44* (2006.01)
*B60T 8/17* (2006.01)
(Continued)

(52) U.S. Cl.
CPC ............. *B64C 25/44* (2013.01); *B60T 8/325* (2013.01); *B60T 17/22* (2013.01); *B64D 45/00* (2013.01);
(Continued)

(58) Field of Classification Search
CPC ......... B64C 25/44; B64C 25/42; B60T 8/325; B60T 17/22; B60T 8/1703; B60T 13/14;
(Continued)

(56) References Cited

U.S. PATENT DOCUMENTS 4,180,223 A    12/1979  Amberg
4,251,115 A    2/1981   Knox et al.
(Continued)

FOREIGN PATENT DOCUMENTS

DE    35 12 110    10/1986
EP    0 909 688    4/1999
(Continued)

OTHER PUBLICATIONS

Extended European Search Report for European Application No. 19157288.2, dated May 23, 2019, eight pages.

*Primary Examiner* — Donald J Wallace
*Assistant Examiner* — Jalal C Coduroglu
(74) *Attorney, Agent, or Firm* — Nixon & Vanderhye P.C.

(57) ABSTRACT

A controller for a hydraulic braking system for an aircraft is disclosed. The hydraulic braking system includes a first accumulator and a second accumulator, the controller configured to: receive first signals including first pressure data from a first pressure transducer associated with the first accumulator, receive second signals including second pressure data from a second pressure transducer associated with the second accumulator, monitor the received first and second signals to determine whether a predetermined condition has been met, and issue a warning indicating a loss of integrity of the hydraulic braking system in response to a determination that one or more predetermined conditions has been met. A hydraulic braking system for an aircraft and method to determine the integrity of a hydraulic braking system are also disclosed.

18 Claims, 2 Drawing Sheets

(51) Int. Cl.
  *B60T 8/32* (2006.01)
  *B60T 13/14* (2006.01)
  *B60T 13/66* (2006.01)
  *B60T 17/22* (2006.01)
  *B64D 45/00* (2006.01)
  *B64F 5/60* (2017.01)

(52) U.S. Cl.
  CPC ............... *B64F 5/60* (2017.01); *B60T 8/1703* (2013.01); *B60T 13/14* (2013.01); *B60T 13/662* (2013.01); *B64D 2045/0085* (2013.01)

(58) Field of Classification Search
  CPC ................. B60T 13/662; B64D 45/00; B64D 2045/0085; B64F 5/60
  See application file for complete search history.

(56) References Cited

U.S. PATENT DOCUMENTS

| | | | |
|---|---|---|---|
| 4,538,228 A * | 8/1985 | Brearey | B60T 8/5081 |
| | | | 303/174 |
| 4,898,257 A | 2/1990 | Brandstadter | |
| 5,044,697 A | 9/1991 | Longyear et al. | |
| 5,097,916 A | 3/1992 | Brandstadter | |
| 5,397,173 A | 3/1995 | Bourguet | |
| 5,909,710 A | 6/1999 | Cummins | |
| 6,241,325 B1 | 6/2001 | Gowan et al. | |
| 6,279,383 B1 * | 8/2001 | Balke | G01M 3/2876 |
| | | | 73/40 |
| 6,293,632 B1 | 9/2001 | Grote et al. | |
| 6,513,885 B1 * | 2/2003 | Salamat | B60T 8/1703 |
| | | | 303/DIG. 9 |
| 8,359,984 B1 | 1/2013 | Wolf et al. | |
| 2001/0045772 A1 * | 11/2001 | Schmidt | B60T 8/404 |
| | | | 303/113.1 |
| 2002/0057012 A1 | 5/2002 | Bourguet et al. | |
| 2004/0239173 A1 * | 12/2004 | Williams | B64C 25/426 |
| | | | 303/3 |
| 2005/0184583 A1 | 8/2005 | Holder | |
| 2006/0256145 A1 * | 11/2006 | Nagashima | B41J 2/14233 |
| | | | 347/1 |
| 2007/0210208 A1 | 9/2007 | Miller | |
| 2008/0127725 A1 | 6/2008 | Sitabkhan et al. | |
| 2009/0292415 A1 | 11/2009 | Averbeck et al. | |
| 2010/0313849 A1 | 12/2010 | Stoner et al. | |
| 2011/0197658 A1 | 8/2011 | Da Costa | |
| 2011/0253489 A1 | 10/2011 | Ward | |
| 2012/0149997 A1 * | 6/2012 | Diab | A61B 5/14546 |
| | | | 600/301 |
| 2012/0305345 A1 | 12/2012 | Ward | |
| 2013/0264418 A1 | 10/2013 | Frank | |
| 2013/0283959 A1 | 10/2013 | Oyama et al. | |
| 2014/0004986 A1 | 1/2014 | Sharpe | |
| 2014/0014447 A1 | 1/2014 | O'Connell et al. | |
| 2014/0166264 A1 | 6/2014 | Judge et al. | |
| 2014/0274522 A1 | 9/2014 | Davis et al. | |
| 2015/0097417 A1 | 4/2015 | Thompson et al. | |
| 2015/0224845 A1 * | 8/2015 | Anderson | B60G 17/019 |
| | | | 701/37 |
| 2016/0016575 A1 | 1/2016 | Howell et al. | |
| 2016/0016576 A1 * | 1/2016 | Howell | B60T 8/1703 |
| | | | 701/3 |
| 2016/0311422 A1 | 10/2016 | van Zanten et al. | |
| 2017/0120884 A1 * | 5/2017 | Mate | F16D 66/02 |
| 2017/0184138 A1 | 6/2017 | Smith et al. | |
| 2018/0370616 A1 | 12/2018 | Howell et al. | |
| 2019/0263508 A1 | 8/2019 | Crane et al. | |

FOREIGN PATENT DOCUMENTS

| | | |
|---|---|---|
| EP | 2 974 922 | 1/2016 |
| EP | 3 418 189 | 12/2018 |
| EP | 3 530 563 | 8/2019 |
| GB | 1 585 321 | 2/1981 |
| GB | 2 520 407 | 5/2015 |
| GB | 2 563 852 | 1/2019 |
| RU | 2 554 050 | 6/2015 |
| RU | 2 563 889 | 9/2015 |
| WO | 2008/049064 | 4/2008 |
| WO | 2012/101340 | 8/2012 |
| WO | 2014/145018 | 9/2014 |
| WO | 2017/210492 | 12/2017 |

\* cited by examiner

CONTROLLER FOR AN AIRCRAFT BRAKING SYSTEM

This application is a Continuation of U.S. patent application Ser. No. 16/275,682, filed Feb. 14, 2019, now allowed, which claims priority to United Kingdom patent application GB 1802485.1, filed Feb. 15, 2018, the entire contents of each of which are hereby incorporated by reference.

TECHNICAL FIELD

The present invention relates to controllers for a hydraulic braking system for an aircraft, hydraulic braking systems, methods to determine the integrity of a hydraulic braking system, and an aircraft.

BACKGROUND

Typically, an aircraft braking system comprises a primary braking system and an alternate braking system for use in the event of non-operability of the primary braking system. In some aircraft, the primary braking system and the alternate braking system are hydraulically operated, and the alternate braking system comprises an accumulator for storing a sufficient volume of hydraulic fluid to perform a predetermined braking operation.

SUMMARY

A first aspect of the present invention provides controller for a hydraulic braking system for an aircraft, the hydraulic braking system comprising a first accumulator and a second accumulator, the controller configured to: receive first signals comprising first pressure data from a first pressure transducer associated with the first accumulator, receive second signals comprising second pressure data from a second pressure transducer associated with the second accumulator, monitor the received first and second signals to determine whether a predetermined condition has been met, and issue a warning indicating a loss of integrity of the hydraulic braking system in response to a determination that one or more predetermined conditions has been met.

Optionally, the controller is configured to issue a first warning if a first predetermined condition of the one or more predetermined conditions is met, the first predetermined condition indicating that the integrity of the first accumulator has been lost, and issue a second warning if a second predetermined condition of the one or more predetermined conditions has been met, the second predetermined condition indicating that the integrity of the second accumulator has been lost.

Optionally, the second predetermined condition comprises that the received first and second signals indicate that the pressure in the first accumulator is greater than the pressure in the second accumulator by an amount that is greater than a cracking pressure of the check valve.

Optionally, the first predetermined condition comprises that the received first and second signals indicate that the pressure in the first accumulator is less than the pressure in the second accumulator.

Optionally, the controller is configured to issue the second warning in response to a third predetermined condition being met, wherein the third predetermined condition of the one or more predetermined conditions comprises that the received first and second signals indicate that the pressure in the first accumulator is greater than or equal to a predetermined threshold pressure and the pressure in the second accumulator is less than the predetermined threshold pressure.

Optionally, the controller is configured to issue the first warning in report to a fourth predetermined condition being met, wherein the fourth predetermined condition of the one or more predetermined conditions comprises that the received first signals indicate that the pressure in the first accumulator is less than the predetermined threshold pressure.

Optionally, the controller is configured to: receive a plurality of first signals from the first pressure transducer over a predetermined period of time, receive a plurality of second signals from the second transducer over the predetermined period of time, calculate a leakage rate of the hydraulic braking system based on the received plurality of first and second signals, and issue a third warning if a fifth predetermined condition is met, wherein the fifth predetermined condition of the one or more predetermined conditions comprises that the calculated leakage rate is greater than the predetermined leakage threshold.

Optionally, the controller is configured to: calculate a reduced leakage threshold in the event that the second signals indicate a loss of integrity in the second accumulator, calculate a leakage rate of the first accumulator based on the plurality of first signals, compare the leakage rate of the first accumulator to the reduced leakage threshold, and issue a fourth warning if a sixth predetermined condition is met, wherein the sixth predetermined condition of the one or more predetermined conditions comprises that the calculated first accumulator leakage rate is greater than the reduced leakage threshold.

Optionally, the controller is configured to: receive a primary first signal indicating a pressure in the first accumulator before an accumulator refill process and a primary second signal indicating a pressure in the second accumulator before the accumulator refill process, receive a secondary first signal indicating a pressure in the first accumulator a predetermined period of time after commencement of the accumulator refill process and a secondary second signal indicating a pressure in the second accumulator the predetermined period of time after commencement of the accumulator refill process, calculate a refill rate of the first and second accumulators based on the primary first and second signals and the secondary first and second signals, compare the calculated refill rate of the accumulators to a predetermined refill threshold, and issue a fifth warning if a seventh predetermined condition is met, wherein the seventh predetermined condition of the one or more predetermined conditions comprises that the calculated refill rate is below the predetermined refill threshold.

Optionally, the controller is configured to calculate a reduced refill threshold in the event that the second signals indicate a loss of integrity in the second accumulator, calculate a refill rate of the first accumulator based on the primary and secondary first signals, compare the refill rate of the first accumulator to the reduced refill threshold, and issue a sixth warning if an eighth predetermined condition is met, wherein the eighth predetermined condition of the one or more predetermined conditions comprises that the refill rate of the first accumulator is below the reduced refill threshold.

A second aspect of the present invention provides a hydraulic braking system for an aircraft, the hydraulic braking system comprising: a first accumulator having a first volume and a second accumulator having a second volume, the second volume being smaller than the first volume, wherein the first accumulator and the second accumulator are configured to provide pressurised hydraulic fluid to one or more brake actuators, a check valve between an outlet of the first accumulator and an outlet of the second accumulator, the check valve configured to permit flow of hydraulic fluid from the outlet of the second accumulator towards the outlet of the first accumulator, and to prevent or hinder flow of hydraulic fluid in the opposite direction, a first pressure transducer configured to measure a pressure of hydraulic fluid at the outlet of the first accumulator and to produce first signals comprising first pressure data associated with the first accumulator, a second pressure transducer configured to measure a pressure of hydraulic fluid at the outlet of the second accumulator and to produce second signals comprising second pressure data associated with the second accumulator, and a controller according to the first aspect of the present invention.

Optionally, the first pressure transducer is positioned between the outlet of the first accumulator and the check valve and the second pressure transducer is positioned between the outlet of the second accumulator and the check valve.

Optionally, the hydraulic braking system is for use in the event of a loss in supply of hydraulic fluid to the hydraulic braking system.

A third aspect of the present invention provides a hydraulic braking system for an aircraft, comprising: first and second accumulators, first and second sensors to provide a signal indicative of a pressure within the respective first and second accumulators, and a controller configured to determine, based on signals received from the first and second sensors, whether a predetermined condition is met and to issue a warning if the predetermined condition is met.

A fourth aspect of the present invention provides a method to determine the integrity of a hydraulic braking system, the hydraulic braking system comprising a first accumulator and a second accumulator, the method comprising: receiving first signals indicative of a pressure in the first accumulator, receiving second signals indicative of a pressure in the second accumulator, monitoring the received first and second signals to determine whether one or more predetermined conditions has been met, and issuing a warning indicating a loss of integrity of the hydraulic braking system in response to a determination that the one or more predetermined conditions has been met.

Optionally, the method comprises: issuing a first warning if a first predetermined condition of the one or more predetermined conditions is met, the first predetermined condition indicating that the integrity of the first accumulator has been lost, and issuing a second warning if a second predetermined condition of the one or more predetermined conditions is met, the second predetermined condition indicating that the integrity of the second accumulator has been lost.

A fifth aspect of the present invention provides an aircraft comprising a controller according to the first aspect of the present invention, or a hydraulic braking system according to the second or third aspects of the present invention.

BRIEF DESCRIPTION OF THE DRAWINGS

Embodiments of the invention will now be described, by way of example only, with reference to the accompanying drawings, in which.

DETAILED DESCRIPTION

The present invention relates to a hydraulic braking system for an aircraft. The hydraulic braking system is for use in the event of a loss in supply of hydraulic fluid to the hydraulic braking system. In such an event, the hydraulic braking system is configured to provide hydraulic fluid to one or more braking actuators. In some embodiments, the hydraulic braking system is a back-up hydraulic braking system for use in the event of a loss in supply of hydraulic fluid to a main hydraulic braking system.

The hydraulic braking system comprises a first accumulator and a second accumulator. In some embodiments, the first accumulator is configured to store a larger volume of hydraulic fluid than the second accumulator. It can be beneficial to monitor the integrity of the hydraulic braking system, so that a warning can be issued if a fault is detected. Such a warning may be used to plan an aircraft landing operation.

The integrity of the hydraulic braking system can be determined by monitoring whether parameters related to the hydraulic braking system are within prescribed limits. If a parameter is observed to be outside of the prescribed limits, a fault may have occurred in the system, which may have caused the loss of integrity of the hydraulic braking system.

Embodiments of the present invention comprise a hydraulic braking system for an aircraft, comprising first and second accumulators, first and second sensors to provide a signal indicative of a pressure within the respective first and second accumulators, and a controller configured to determine, based on signals received from the first and second sensors, whether a predetermined condition is met and to issue a warning if the predetermined condition is met.

In embodiments of the present invention, a warning may comprise an electrical signal. In some embodiments, the warning may comprise data related to the first and/or second accumulator. The warning may be visual and/or audible. Different warnings may be differentiated by, for example, a different electrical signal, a different sound and/or a different visual indication. The warning may be transmitted to a cockpit of the aircraft to provide an indication of the status of the hydraulic braking system. In some embodiments, the warning may be transmitted to a receiver offboard of the aircraft, so that non-routine maintenance can be carried out when a fault has been detected.

Figure 1:
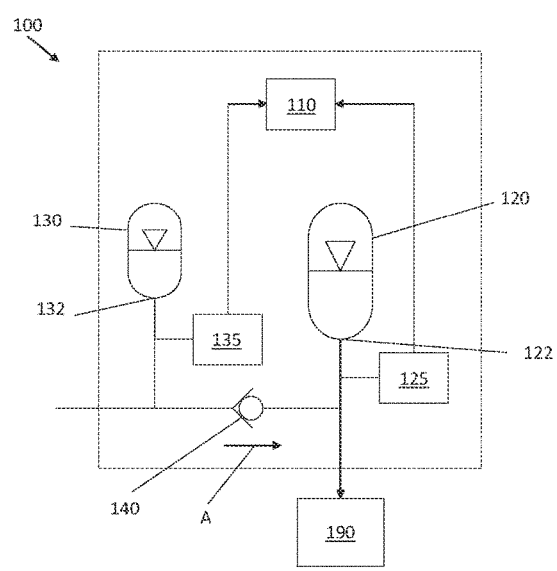
FIG. 1 shows a schematic view of a hydraulic braking system for an aircraft according to embodiments of the present invention.

FIG. 1 shows a hydraulic braking system 100 for an aircraft according to an embodiment of the present invention. The hydraulic braking system 100 comprises a first accumulator 120 having a first volume and a second accumulator 130 having a second volume, the second volume being smaller than the first volume. The first accumulator 120 and the second accumulator 130 are configured to provide pressurised hydraulic fluid to one or more brake actuators 190.

The hydraulic braking system 100 further comprises a check valve 140 between an outlet 122 of the first accumulator 120 and an outlet 132 of the second accumulator 130. The check valve 140 is configured to permit flow of hydraulic fluid from the outlet 132 of the second accumulator 130 towards the outlet 122 of the first accumulator 120, as represented by arrow A in FIG. 1, and to prevent or hinder flow of hydraulic fluid in the opposite direction. The check valve 140 helps to prevent or hinder a significant leak of hydraulic fluid from the hydraulic braking system 100 in the event of a loss of integrity of the second accumulator 130 but no loss of integrity of the first accumulator 120, which may help to allow the hydraulic braking system 100 to operate using only the first accumulator 120 in the event of a loss of integrity of the second accumulator 130. The check valve 140 has a cracking pressure, as is known in the art.

The hydraulic braking system 100 further comprises a first pressure transducer 125 configured to measure a pressure of hydraulic fluid at the outlet 122 of the first accumulator 120 and to produce first signals comprising first pressure data associated with the first accumulator 120, a second pressure transducer 135 configured to measure a pressure of hydraulic fluid at the outlet 132 of the second accumulator 130 and to produce second signals comprising second pressure data associated with the second accumulator 130, and a controller 110 to receive the first signals and the second signals.

In the embodiment shown in FIG. 1, the first pressure transducer 125 is positioned between the outlet 122 of the first accumulator 120 and the check valve 140 and the second pressure transducer 135 is positioned between the outlet 132 of the second accumulator 130 and the check valve 140. Typically, when the integrity of the hydraulic braking system 100 is sufficient, a pressure in the first accumulator 120 is substantially equal to a pressure in the second accumulator 130. Hydraulic pressure may be lower at a position downstream of the check valve 140 compared to hydraulic pressure at a position upstream of the check valve 140 due to losses that occur as hydraulic fluid passes through the check valve 140, by an amount that is small compared to the operating pressure of the hydraulic braking system 100.

Embodiments of the present invention provide a controller for a hydraulic braking system for an aircraft, such as the controller 110 shown in FIG. 1. The controller 110 is configured to receive the first signals from the first pressure transducer 125, receive the second signals from the second pressure transducer 135, monitor the received first and second signals to determine whether a predetermined condition has been met, and, issue a warning indicating a loss of integrity of the hydraulic braking system 100 in response to a determination that one or more predetermined conditions has been met.

In some embodiments, the controller 110 is configured to issue a first warning if a first predetermined condition of the one or more predetermined conditions is met, the first predetermined condition indicating that the integrity of the first accumulator 1202 has been lost, and to issue a second warning if a second predetermined condition of the one or more predetermined conditions has been met, the second predetermined condition indicating that the integrity of the second accumulator 130 has been lost.

In some embodiments, the first warning is different to the second warning. It can be beneficial to be able to detect an integrity of the first accumulator 120 and, separately, an integrity of the second accumulator 130, in addition to detecting the integrity of the whole hydraulic braking system 100. Such a detection can help to reduce maintenance time by identifying which components are exhibiting a fault. Such a detection can help to determine whether an aircraft comprising a hydraulic braking system according to the invention can be flown. In some embodiments, issue of the second warning indicates that the aircraft braking system 100 is operable with the first accumulator 120 only and issue of the first warning indicates that the aircraft braking system 100 is not operable.

In some embodiments, the second predetermined condition comprises that the received first and second signals indicate that the pressure in the first accumulator 120 is greater than the pressure in the second accumulator 130 by an amount that is greater than a cracking pressure of the check valve 140. As such, the controller 110 is configured to issue the second warning if the received first and second signals indicate that the pressure in the first accumulator 120 is greater than the pressure in the second accumulator 130 by an amount that is greater than the cracking pressure of the check valve 140. Such a difference in pressure between the first accumulator 120 and the second accumulator 130 may indicate that hydraulic fluid is leaking from the second accumulator 130, and thus that a loss of integrity of the second accumulator 130 has occurred.

In some embodiments, the first predetermined condition comprises that the received first and second signals indicate that the pressure in the first accumulator 120 is less than the pressure in the second accumulator 130. As such, the controller 110 is configured to issue the first warning if the received first and second signals indicate that the pressure in the first accumulator 120 is less than the pressure in the second accumulator 130. Such a difference in pressure between the first accumulator 120 and the second accumulator 130 may indicate a loss of integrity of the first accumulator 120.

In some embodiments, the controller 110 is configured to issue the second warning in response to a third predetermined condition being met. The third predetermined condition of the one of more predetermined conditions comprises that the received first and second signals indicate that the pressure in the first accumulator 120 is greater than or equal to a predetermined threshold pressure and the pressure in the second accumulator 130 is less than the predetermined threshold pressure. A loss of pressure in only the second accumulator 130 may be indicative of a loss of integrity of the second accumulator 130.

In some embodiments, the controller 110 is configured to issue the first warning in response to a fourth predetermined condition being met. The fourth predetermined condition of the one of more predetermined conditions comprises that the received first signals indicate that the pressure in the first accumulator 120 is less than the predetermined threshold pressure. A loss of pressure in the first accumulator 120 may be indicative of a loss of integrity of the first accumulator 120.

The predetermined pressure threshold may be a minimum pressure required for the hydraulic braking system 100 to perform a predetermined braking operation. In some embodiments, the predetermined pressure threshold may be determined by a number of environmental factors, for example, one or more of an aircraft altitude, temperature and a time since the first and second accumulators 120, 130 were last refilled. In some embodiments, the controller 110 may be configured to adjust the predetermined pressure threshold in dependence of a determined integrity of the second accumulator 130.

In some embodiments, the controller 110 is configured to: receive a plurality of first signals from the first pressure transducer 125 over a predetermined period of time, receive a plurality of second signals from the second transducer 135 over the predetermined period of time, calculate a leakage rate of the hydraulic braking system 100 based on the received plurality of first and second signals, and issue a third warning if a fifth predetermined condition is met. The fifth predetermined condition of the one of more predetermined conditions comprises that the calculated leakage rate is greater than a predetermined leakage threshold. The third warning may be different from the first warning and the second warning. A leakage rate that is greater than the predetermined leakage rate may indicate that hydraulic fluid is leaking from the hydraulic braking system 100 at a rate that is faster than an expected leakage rate, and thus that a loss of integrity of the hydraulic braking system 100 has occurred.

The controller 110 may be further configured to: calculate a reduced leakage threshold in the event that the second signals indicate a loss of integrity in the second accumulator 130, calculate a leakage rate of the first accumulator 120 based on the plurality of first signals, compare the leakage rate of the first accumulator 120 to the reduced leakage threshold, and issue a fourth warning if a sixth predetermined condition is met. The sixth predetermined condition of the one of more predetermined conditions comprises that the leakage rate of the first accumulator 120 is greater than the reduced leakage threshold. The fourth warning may be different from the first warning, the second warning and the third warning. In some embodiments, the fourth warning may be the same as the first warning. If the leakage rate of the first accumulator 120 is greater than the reduced leakage rate, this may indicate that hydraulic fluid is leaking from the accumulator 120 at a rate that is faster than an expected leakage rate, and thus that a loss of integrity of the first accumulator 120 has occurred.

In other embodiments, the controller 110 may be configured to calculate a leakage rate of the first and second accumulators 120, 130 by measuring a time between a first and a second accumulator refill process, and comparing the time to a predetermined refill interval. The controller 110 may be configured to issue the third warning if the time between the first and second accumulator refill processes is less than the predetermined refill interval. A time between the first and second accumulator refill processes being less that the predetermined refill interval may indicate that a leakage rate of the hydraulic braking system 100 is faster than an expected leakage rate, and thus that a loss of integrity of the hydraulic braking system 100 has occurred.

The predetermined leakage threshold may be based upon an expected loss of pressure in a normally-functioning accumulator 120, 130 over a particular period. A faster loss of pressure in the first and second accumulators 120, 130 may indicate a loss of integrity of the hydraulic braking system 100. Calculating a leakage rate of the first and second accumulators 120, 130 may help to identify a fault in the hydraulic braking system 100 before a pressure of the first and second accumulators 120, 130 falls below a predetermined pressure threshold.

In some embodiments, the controller 110 is configured to receive a primary first signal indicating a pressure in the first accumulator 120 before an accumulator refill process and a primary second signal indicating a pressure in the second accumulator 130 before the accumulator refill process, and receive a secondary first signal indicating a pressure in the first accumulator 120 a predetermined period of time after commencement of the accumulator refill process and a secondary second signal indicating a pressure in the second accumulator 130 the predetermined period of time after commencement of the accumulator refill process. The controller 110 is configured to then: calculate a refill rate of the first and second accumulators 120, 130 based on the primary first and second signals and the secondary first and second signals, compare the calculated refill rate of the accumulators 120, 130 to a predetermined refill threshold, and issue a fifth warning if a seventh predetermined condition is met. The seventh predetermined condition of the one of more predetermined conditions comprises that the calculated refill rate is below the predetermined refill threshold.

The controller 110 may be further configured to: calculate a reduced refill threshold in the event that the second signals indicate a loss of integrity in the second accumulator 130, calculate a refill rate of the first accumulator 120 based on the primary and secondary first signals, compare the refill rate of the first accumulator 120 to the reduced refill threshold, and issue a sixth warning if an eighth predetermined condition is met. The eighth predetermined condition of the one of more predetermined conditions comprises that the refill rate of the first accumulator 120 is below the reduced refill threshold.

The predetermined refill threshold may be based on an expected increase in accumulator pressure over a particular period during the accumulator refill process. A slower rate of pressure increase in the first and second accumulators 120, 130 may indicate a loss of integrity of the hydraulic braking system 100.

Figure 2:
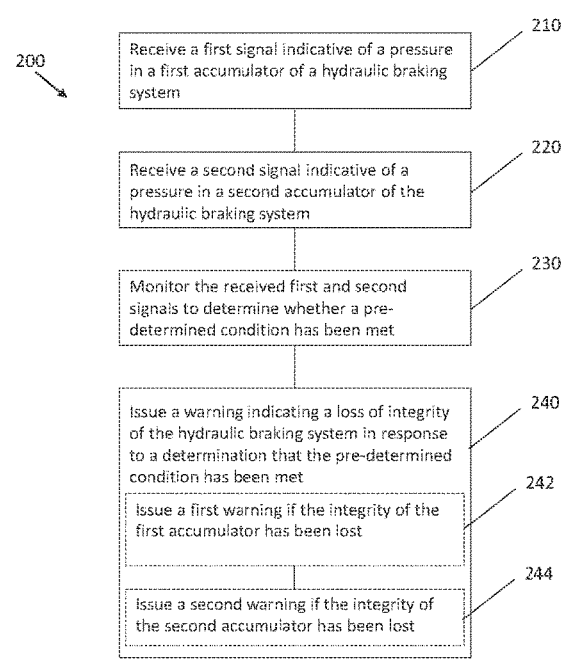
FIG. 2 is a flow diagram showing an example of a method according to an embodiment of the present invention.

FIG. 2 is a flow diagram showing a method 200 to determine the integrity of a hydraulic braking system, according to embodiments of the present invention. The hydraulic braking system comprises a first accumulator and a second accumulator. The method 200 comprises: receiving 210 first signals indicative of a pressure in the first accumulator of the hydraulic braking system, receiving 220 second signals indicative of a pressure in the second accumulator of the hydraulic braking system, monitoring 230 the received first and second signals to determine whether one or more predetermined conditions has been met, and issuing 240 a warning indicating a loss of integrity of the hydraulic braking system in response to a determination that the one or more predetermined conditions has been met.

In some embodiments, that method comprises: issuing 242 a first warning if a first predetermined condition of the one or more predetermined conditions is met, the first predetermined condition indicating that the integrity of the first accumulator has been lost, and issuing 244 a second warning if a second predetermined condition of the one or more predetermined conditions is met, the second predetermined condition indicating that the integrity of the second accumulator has been lost. Issuing 242, 244 the first and second warnings is shown in the dashed boxes of FIG. 2.

In some embodiments, the monitoring 230 may comprise comparing the first signal to the second signal. In some embodiments, the monitoring 230 may comprise comparing the first signal and/or the second signal to a predetermined pressure threshold. In some embodiments, the monitoring 230 may comprise calculating a leakage rate of the hydraulic braking system and comparing the leakage rate to a predetermined leakage rate. In some embodiments, the monitoring may comprise calculating a refill rate of the hydraulic braking system and comparing the refill rate to a predetermined refill rate.

The method 200 may be used to determine the integrity of a hydraulic braking system 100 according to the present invention. The method 200 may be performed by a controller 110 according to the present invention.

Figure 3:
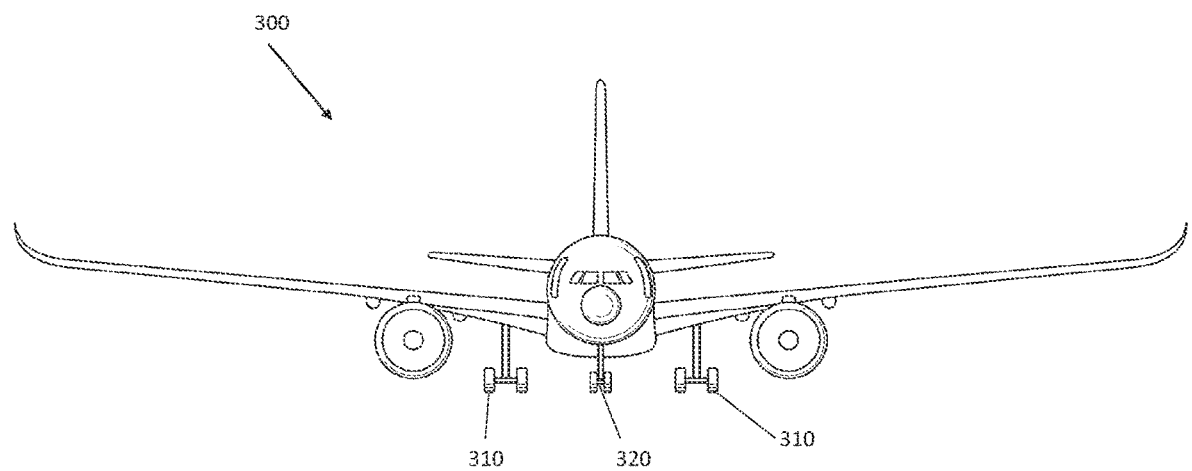
FIG. 3 is a schematic front view of an example of an aircraft according to an embodiment of the present invention.

Some embodiments of the present invention provide an aircraft 300, as shown in FIG. 3. In some embodiments, the aircraft comprises one or more main landing gears 310 and a nose landing gear 320, each comprising one or more wheels. In some embodiments, the aircraft 300 comprises a controller 110 according embodiments of the present invention. In some embodiments, the aircraft 300 comprises a hydraulic braking system according to any of the embodiments described herein, for example hydraulic braking system 100. Some embodiments of the invention provide an aircraft 300 configured to perform a method 200 according to any of the embodiments described herein.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A controller for a hydraulic braking system for an aircraft, the hydraulic braking system comprising a first accumulator and a second accumulator, the controller configured to:
receive first signals comprising first pressure data from a first pressure transducer associated with the first accumulator;
receive second signals comprising second pressure data from a second pressure transducer associated with the second accumulator;
monitor the received first and second signals to determine whether a predetermined condition has been met; and
issue a warning indicating a loss of integrity of the hydraulic braking system in response to a determination that one or more predetermined conditions has been met.

2. The controller according to claim 1, configured to:
issue a first warning if a first predetermined condition of the one or more predetermined conditions is met, the first predetermined condition indicating that the integrity of the first accumulator has been lost; and
issue a second warning if a second predetermined condition of the one or more predetermined conditions has been met, the second predetermined condition indicating that the integrity of the second accumulator has been lost.

3. The controller according to claim 2, wherein the first accumulator and second accumulator are hydraulically linked at their outlets by a check valve, and wherein the second predetermined condition comprises that the received first and second signals indicate that the pressure in the first accumulator is greater than the pressure in the second accumulator by an amount that is greater than a cracking pressure of the check valve.

4. The controller according to claim 3, wherein the first predetermined condition comprises that the received first and second signals indicate that the pressure in the first accumulator is less than the pressure in the second accumulator.

5. The controller according to claim 4, configured to:
receive a plurality of first signals from the first pressure transducer over a predetermined period of time;
receive a plurality of second signals from the second transducer over the predetermined period of time;
calculate a leakage rate of the hydraulic braking system based on the received plurality of first and second signals; and
issue a third warning if a fifth predetermined condition is met,
wherein the fifth predetermined condition of the one or more predetermined conditions comprises that the calculated leakage rate is greater than the predetermined leakage threshold.

6. The controller according to claim 5, configured to:
calculate a reduced leakage threshold in the event that the second signals indicate a loss of integrity in the second accumulator;
calculate a leakage rate of the first accumulator based on the plurality of first signals;
compare the leakage rate of the first accumulator to the reduced leakage threshold; and
issue a fourth warning if a sixth predetermined condition is met,
wherein the sixth predetermined condition of the one or more predetermined conditions comprises that the calculated first accumulator leakage rate is greater than the reduced leakage threshold.

7. The controller according to claim 2, configured to issue the second warning in response to a third predetermined condition being met,
wherein the third predetermined condition or the one of more predetermined conditions comprises that the received first and second signals indicate that the pressure in the first accumulator is greater than or equal to a predetermined threshold pressure and the pressure in the second accumulator is less than the predetermined threshold pressure.

8. The controller according to claim 7, configured to issue the first warning in report to a fourth predetermined condition being met,
wherein the fourth predetermined condition of the one or more predetermined conditions comprises that the received first signals indicate that the pressure in the first accumulator is less than the predetermined threshold pressure.

9. The controller according to claim 2, configured to:
receive a primary first signal indicating a pressure in the first accumulator before an accumulator refill process and a primary second signal indicating a pressure in the second accumulator before the accumulator refill process;
receive a secondary first signal indicating a pressure in the first accumulator a predetermined period of time after commencement of the accumulator refill process and a secondary second signal indicating a pressure in the second accumulator the predetermined period of time after commencement of the accumulator refill process;
calculate a refill rate of the first and second accumulators based on the primary first and second signals and the secondary first and second signals;
compare the calculated refill rate of the accumulators to a predetermined refill threshold; and
issue a fifth warning if a seventh predetermined condition is met,
wherein the seventh predetermined condition of the one or more predetermined conditions comprises that the calculated refill rate is below the predetermined refill threshold.

10. The controller according to claim 9, configured to:
calculate a reduced refill threshold in the event that the second signals indicate a loss of integrity in the second accumulator;
calculate a refill rate of the first accumulator based on the primary and secondary first signals;
compare the refill rate of the first accumulator to the reduced refill threshold; and
issue a sixth warning if an eighth predetermined condition is met,
wherein the eighth predetermined condition of the one or more predetermined conditions comprises that the refill rate of the first accumulator is below the reduced refill threshold.

11. A hydraulic braking system for an aircraft, comprising:
a first accumulator having a first volume and a second accumulator having a second volume, the second volume being smaller than the first volume, wherein the first accumulator and the second accumulator are configured to provide pressurised hydraulic fluid to one or more brake actuators;
a check valve between an outlet of the first accumulator and an outlet of the second accumulator, the check valve configured to permit flow of hydraulic fluid from the outlet of the second accumulator towards the outlet of the first accumulator, and to prevent or hinder flow of hydraulic fluid in the opposite direction;
a first pressure transducer configured to measure a pressure of hydraulic fluid at the outlet of the first accumulator and to produce first signals comprising first pressure data associated with the first accumulator;
a second pressure transducer configured to measure a pressure of hydraulic fluid at the outlet of the second accumulator and to produce second signals comprising second pressure data associated with the second accumulator; and
a controller according to claim 1.

12. The hydraulic braking system according to claim 11, wherein the first pressure transducer is positioned between the outlet of the first accumulator and the check valve and the second pressure transducer is positioned between the outlet of the second accumulator and the check valve.

13. The hydraulic braking system according to claim 11, for use in the event of a loss in supply of hydraulic fluid to the hydraulic braking system.

14. An aircraft comprising a hydraulic braking system according to claim 11.

15. An aircraft comprising a controller according to claim 1.

16. A hydraulic braking system for an aircraft, comprising:
first and second accumulators;
first and second sensors to provide a signal indicative of a pressure within the respective first and second accumulators; and
a controller configured to determine, based on signals received from the first and second sensors, whether a predetermined condition is met and to issue a warning if the predetermined condition is met.

17. A method to determine the integrity of a hydraulic braking system, the hydraulic braking system comprising a first accumulator and a second accumulator, the method comprising:
receiving first signals indicative of a pressure in the first accumulator;
receiving second signals indicative of a pressure in the second accumulator;
monitoring the received first and second signals to determine whether one or more predetermined conditions has been met; and
issuing a warning indicating a loss of integrity of the hydraulic braking system in response to a determination that the one or more predetermined conditions has been met.

18. The method of claim 17, comprising:
issuing a first warning if a first predetermined condition of the one or more predetermined conditions is met, the first predetermined condition indicating that the integrity of the first accumulator has been lost; and
issuing a second warning if a second predetermined condition of the one or more predetermined conditions is met, the second predetermined condition indicating that the integrity of the second accumulator has been lost.

* * * * *